(12) United States Patent
Akahori

(10) Patent No.: US 6,469,410 B2
(45) Date of Patent: Oct. 22, 2002

(54) SPINDLE MOTOR FOR DRIVING DISC

(75) Inventor: Tadashi Akahori, Kitasaku-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/876,133

(22) Filed: Jun. 8, 2001

(65) Prior Publication Data
US 2001/0054854 A1 Dec. 27, 2001

(30) Foreign Application Priority Data
Jun. 22, 2000 (JP) ........................................ 2000-187805

(51) Int. Cl.⁷ ............................ H02K 5/16; H02K 21/12
(52) U.S. Cl. ...................................... 310/90; 370/156.45
(58) Field of Search ................................ 370/67 R, 90, 370/156.45, 156.43; 360/98.07, 99.04, 99.08

(56) References Cited

U.S. PATENT DOCUMENTS

| | | | |
|---|---|---|---|
| 5,138,209 A | 8/1992 | Chuta et al. | 310/67 R |
| 5,381,066 A | 1/1995 | Miyaji et al. | 310/90 |
| 5,382,853 A * | 1/1995 | von der Heide et al. | 310/156.05 |
| 5,552,650 A | 9/1996 | Cap et al. | 310/67 R |
| 5,949,164 A | 9/1999 | Cap et al. | 310/67 R |
| 6,031,310 A | 2/2000 | Ishikawa et al. | 310/156 |

* cited by examiner

Primary Examiner—Joseph Waks
Assistant Examiner—Dane Dinh Le
(74) Attorney, Agent, or Firm—Oliff & Berridge, PLC

(57) ABSTRACT

In an outer rotor type spindle motor for driving a disc with a relatively long axial dimension for mounting a large number of the discs, it is possible to reduce part cost and assembling work cost while increasing a rotational precision. The stator is disposed on an opening surface of a drum portion of the rotor rather than between a pair of bearings within the drum portion. The stator coil end may be led to the outside of the drum portion without passing through the bearing to dispense with the conventional works such as a processing of a shaft, an insertion of a lead wire through a tubular hole and the like. Also, a bush between the drum portion and the bearing, which conventionally causes the degradation of the rotational precision and the increases in the cost for the parts and the assembling work, is dispensed with. In order to elongate the distance between the bearings and reduce the axial direction of the stator, a magnet material having a magnetic energy product that is higher than that generally used to this type of motor is selected.

3 Claims, 4 Drawing Sheets

SPINDLE MOTOR FOR DRIVING DISC

BACKGROUND OF THE INVENTION

1. Field of the Invention

The present invention relates to an improvement in an outer rotor type disc driving spindle motor on which a plurality of discs such as magnetic discs are to be laminated and mounted.

2. Description of the Related Art

A rotor diameter of an outer rotor type disc driving spindle motor is increased due to its structure. An inertia moment is increased so that a rotational non-uniformity is reduced. Accordingly, the outer rotor type disc driving spindle motor is suitable as a magnetic disc driving motor to be used, for instance, as a memory medium for a computer.

There has been provided conventionally a disc driving spindle motor on which a plurality (about ten) of magnetic discs are able to be loaded in lamination in a magnetic disc driving device called "1.6 Inch-Height" with 40.6 mm in total height.

Such a conventional spindle motor for driving a disc is shown in FIG. 4.

As shown in FIG. 4, in an outer rotor type disc driving spindle motor, a rotor 3 (hub) having magnets 3a that face a stator 2 having coils 2a (stator coils) are located outside the stator 2 fixedly supported to a shaft. The energization of the stator 2 to cause rotation of rotor 3 (hub) by interaction of the stator 2 with magnets 3a is caused by controlled electrical signals provided on wires to coil windings.

In such a conventional spindle motor for driving a disc, the rotor 3 and the stator 2 are provided with the following support structure.

The rotor 3 is formed to have a substantially cylindrical drum portion 3b in which an axial dimension is set so that a plurality (predetermined number, e.g., ten in this case) of discs (not shown) may be laminated in the axial direction and loaded on its outer circumference. Then, the rotor 3 is rotatably supported on the shaft 1 through an upper bearing 4 located on an opening surface 3c on the upper side and a lower bearing 5 located at an opening surface 3d on the lower side of the drum portion 3b of FIG. 4.

In this case, a substantially annular bush 6 is interposed between opening ends of the lower opening surface 3d and the lower bearing 5. Accordingly, the lower end portion of the rotor 3 is supported by the lower bearing 5 through the bush 6. The hub is indirectly supported by the bearing 5 via a bush 6.

The stator 2 is disposed between the upper and lower bearings 4 and 5. In this stator 2, the axial dimension S2 is set to be substantially the same as the axial dimension M2 of the magnets 3a. The stator 2 is fixedly supported on the shaft 1 over the range of the full axial dimension S2.

Incidentally, reference character 1a denotes a tubular hole formed in the shaft 1 and 2a1 denotes a lead wire connected to a coil end of the stator coils 2a. This lead wire 2a1 is inserted into the tubular hole 1a to be guided to the outside of the rotor 3 (drum portion 3b). Reference numeral 7 denotes a frame for holding and fixing the shaft 1, and the frame 7 is located so as to cover the bush 6.

Any one of the bearings 4 and 5 is a radial bearing as shown in FIG. 4.

The magnet 3a is made of magnet material having a magnetic energy product of 160 kJ/m3 that is a typical example of this type motor. The magnet 3a is fixed to an inner wall of the drum portion 3b of the rotor 3 with an axial dimension that is close to the full length between the upper and lower bearings 4 and 5.

However, the prior art suffers from the following disadvantages.

Since the stator 2 is interposed between the upper and lower bearings 4 and 5, the lead wire 2a1 from the stator coils 2a has to be led to the outside of the rotor 3 through the tubular hole 1a of the shaft 1. For this reason, it is necessary to perform the processing of the shaft 1, the insertion of the lead wire 2a1 through the tubular hole 1a, and the like, thereby increasing both the part cost and the assembling work cost. Also, the structure itself in which the stator 2 is interposed between the upper and lower bearings 4 and 5 causes labors for assembling the stator 2 to be increased.

Since the bush 6 is interposed between the lower bearing 5 and the rotor 3, the assembling precision and hence the rotational precision would be degraded. It gives trouble to enhance the precision. In addition, since the bush 6 is an expensive and precise part, the part cost and the assembling work cost are both increased.

In particular, such a complicated structure, in which the annular hole 1a is formed in the shaft 1, the lead wire 2a1 is passed through the annular hole 1a, and the bush 6 is provided in addition to the frame 7, results in more difficulty and causes a cost increase in the assembly.

Incidentally, it is possible to solve the above mentioned problem by disposing the stator 2 under the lower bearings 4 and 5 by providing the stator 2 outside (on the side of the opening surface 3d on the lower side of the drum portion) rather than between the upper and lower bearings 4 and 5. This will now be explained.

In the motor shown in FIG. 4, assume that the relationships, L:S2=1:0.38 and L:B2=1:0.66, are established where L is the length of the shaft 1 (nearly equal to the total motor length) and B2 is the distance between the bearings 4 and 5.

Keeping the shaft length L intact, i.e., under the condition that the motor is not enlarged, the value S2 to the value L (the dimension in the axial direction of the stator) and the distance between the bearings 4 and 5 (referred to as B3 for the sake of explanation although not shown) are sought in the case where the stator 2 is shifted from the distance between the bearings 4 and 5 to the outside. Then, the relationship, L:S2=1:0.38, is unchanged but the relationship, L:B3=1:0.22, is established.

Since the axial dimension S2 of the stator is too large, the ratio of the dimension B3 between the bearings 4 and 5 to the shaft length (nearly equal to the total motor length) is extremely small at 0.22. For this reason, the center between the bearing 4 and 5 is remarkably eccentric from the center of gravity of the rotor 3 on which the discs are mounted, as a result of which the bearing load is displaced to adversely affect the rotational precision or the service life of the bearings.

It is basically preferable that the discs be located in a place corresponding to a position between the bearings 4 and 5. If the distance (ratio) between the bearings 4 and 5 is reduced, the number of the discs that may be mounted is also reduced. Accordingly, it is preferable that the ratio L:B of the distance B between the bearings 4 and 5 to the dimension L be large, and in general, the ratio is needed to be about 0.5 at the minimum.

However, as described above, such a simple method to shift the stator 2 from the space between the bearings 4 and 5 to the outside is not actually adopted because the ratio is extremely small at 0.22. Accordingly, the above-described problems could not yet solved in the state of the art.

SUMMARY OF THE INVENTION

In order to solve the problems inherent in the above-described prior art, an object of the present invention is to provide a spindle motor for driving discs, which may reduce the part cost and the assembling work cost and enhance the assembling precision and the rotational precision.

In order to attain this and other objects, according to a first aspect of the present invention, there is provided an outer rotor type disc driving spindle motor in which a rotor having a magnet facing a stator having a coil and supported to a shaft is located outside of the stator, characterized in that: the rotor is formed to have a cylindrical drum portion to have an axial dimension so that a predetermined number of discs may be laminated in the axial direction and mounted around an outer circumference of the rotor, the rotor being rotatably mounted on the shaft through a first bearing positioned in the vicinity of one of opening surfaces of the drum portion and a second bearing positioned in a predetermined position on a side of the other opening surface, the stator is disposed on the side of the other opening surface beyond the second bearing and is fixed to a frame for holding the shaft in the vicinity of the other opening surface to be supported by the shaft through the frame, an end surface position on the side of the second bearing is set to be at the same position as a position of the laminate surface position of the discs set in a predetermined position, on the side of the other opening surface, of the outer circumference of the drum portion or closer to the side of the other opening surface, with an outer diameter of the stator being set to be smaller than an outer diameter of the drum portion, the magnet has a magnetic energy product such that a ratio of a distance between the first and second bearings to a length of the shaft (nearly equal to the total motor length) maybe set at 0.5 or more, and a spacer is disposed between outer races of the first and second bearings.

According to a second aspect of the invention, in the first aspect of the invention, it is characterized that the spacer is a flanged portion formed to project from an inner wall of the drum portion of the rotor.

According to a third aspect of the invention, in the first aspect of the invention, it is characterized that each of the outer races of the first and second bearings is formed integrally with the spacer and an inner race of the second bearing is formed integrally with the shaft.

According to the first aspect of the invention, the stator is disposed on the opposite side to the space between the first and second bearings within the rotor drum portion, i.e., on the side of the other opening surface of the drum portion.

Accordingly, it is possible to lead the coil end of the stator coil to the outside of the drum portion without passing through the bearings. Thus, it is possible to dispense with the processing of the shaft, the work for passing the lead wire through the tubular hole and the like, thereby reducing both the part cost and the assembling work cost.

With such an arrangement, it is possible to facilitate the assembling work of the stator in comparison with the prior art in which the stator is disposed between the first and second bearings. According to the present invention, the stator is fixed to the frame for holding the shaft to be supported by the shaft through the frame. If the stator is fixed to the frame in advance, the stator is supported by the shaft by coupling the frame and the shaft. Accordingly, the assembling work of the stator may be further facilitated.

Any bush is not provided between the opening ends of the opening surfaces of the drum portion or between the bearings, and the drum portion is supported by the shaft through the first and second bearings. Accordingly, it is possible to avoid the degradation not only in assembling precision but also in rotational precision and further, to reduce both the part cost and the assembling work cost. Incidentally, the spacer functions to position and fix the first and second bearings.

If the end position on the second bearing side of the stator is set on the side of one of the opening surfaces beyond the laminate surface position of the discs, the second bearing has to be set at the position displaced toward the first bearing correspondingly to reduce the interval between the first and second bearings.

According to the first aspect, in contrast thereto, the end surface position of the stator on the second bearing side is set at the same position as the laminate surface position of the discs or closer to the other opening surface from the laminate surface position, it is possible to enlarge the distance between the first and second bearings.

With such an arrangement, it is possible to ensure the stable rotation of the rotor drum portion to mount a larger number of the discs thereon. Inversely, if the number of the discs to be mounted is determined, it is possible to shorten the axial dimension of the rotor drum portion (shaft length) to mount the same number of the discs and to miniaturize the motor as a whole in the axial direction.

The larger the magnetic energy product of the magnet facing the stator is, the smaller the axial dimension S of the stator will become. The ratio L:B of the distance between the first and second bearings to the shaft length L (nearly equal to the total motor length) can be set to be large.

As a result, it is possible to increase the distance between the bearings and to rotate the rotor in a stable manner to enhance the rigidity and rotational precision.

According to the first aspect of the invention, the magnet has the magnetic energy product that exceeds the conventional value of 160 kJ/m3. In the case where the above-described ratio L:B is obtained while keeping the other conditions such as the magnetic characteristics of the stator or the like unchanged, it is possible to realize the value 0.5 or more that is generally needed.

With such a structure, it is possible to facilitate the arrangement of the stator to the other opening surface side. In addition, it is possible to further shorten the axial dimension of the rotor drum portion that is needed to mount the constant number of the discs with the increase in the distance between the first and second bearings.

According to the first aspect of the invention, it is possible to shorten both the axial dimension and the dimension perpendicular to the axial direction of the motor as a whole. Namely, it is possible to miniaturize the overall contour of the motor. At this time, it is unnecessary to reduce the number of the discs to be mountable and also, there is no fear of the unstable rotation about the axis of the rotor.

According to the second aspect of the invention, the flanged portion is formed to project from the inner wall of the drum portion of the rotor, and this is used as the space according to the first aspect. It is thus possible to reduce the number of the mechanical parts to simplify the structure.

According to the third aspect of the invention, the first and second bearings, the spacer and the shaft are formed integrally. It is thus possible to further reduce the number of the mechanical parts and to simplify the structure to enhance the rotational precision. Furthermore, the motor precision is free from the adverse affect of the change in environmental temperature.

DESCRIPTION OF THE PREFERRED EMBODIMENTS

An embodiment of the present invention will now be described with reference to the accompanying drawings.

Figure 1:
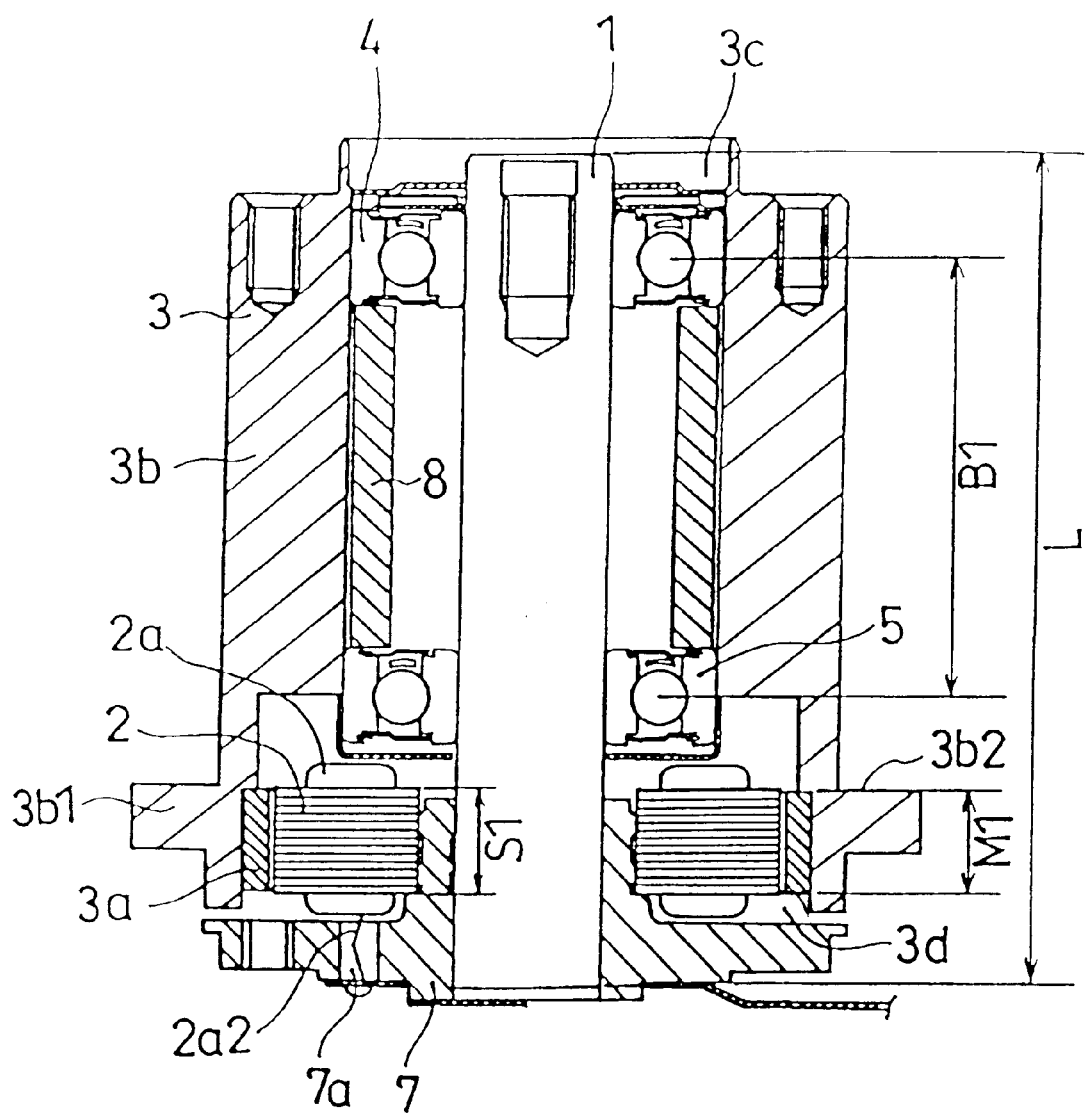
FIG. 1 is a longitudinal sectional view showing a disc driving spindle motor according to one embodiment of the present invention.

FIG. 1 is a longitudinal sectional view showing a spindle motor for driving discs according to one embodiment of the present invention.

As shown in FIG. 1, a rotor (hub) 3 having magnets 3a that face a stator 2 having coils (stator coils) 2a is located outside of the stator 2 fixedly supported to a shaft 1. Then, the energization of the stator 2 to cause rotation of rotor 3 (hub) by interaction of the stator 2 with magnets 3a is caused by controlled electrical signals provided on wires to coil windings. These points are not different from those of the prior art.

There is no difference in a point between the present invention and the prior art that the rotor 3 is formed to have a substantially cylindrical drum portion 3b in which an axial dimension is set so that a plurality (predetermined number, e.g., ten in this case) of discs (not shown) may be laminated in the axial direction and loaded on its outer circumference.

It should be noted that the portion where the stator 2 and the magnets 3a are located is coaxial with the other portion but has a larger diameter than that of the other portion so that the interior of the drum portion 3b is stepped as shown in FIG. 1.

The structure peculiar to the disc driving spindle motor according to the present invention will now be described.

The rotor 3 is rotatably supported by the shaft 1 through the upper bearing 4 located in the vicinity of the opening surface 3c on the upper side of the drum portion 3b (hereinafter referred to as an upper opening surface) and the lower bearing 5 located at a predetermined position on the side of the opening surface 3d on the lower side (hereinafter referred to as a lower opening surface) in FIG. 1.

Figure 4:
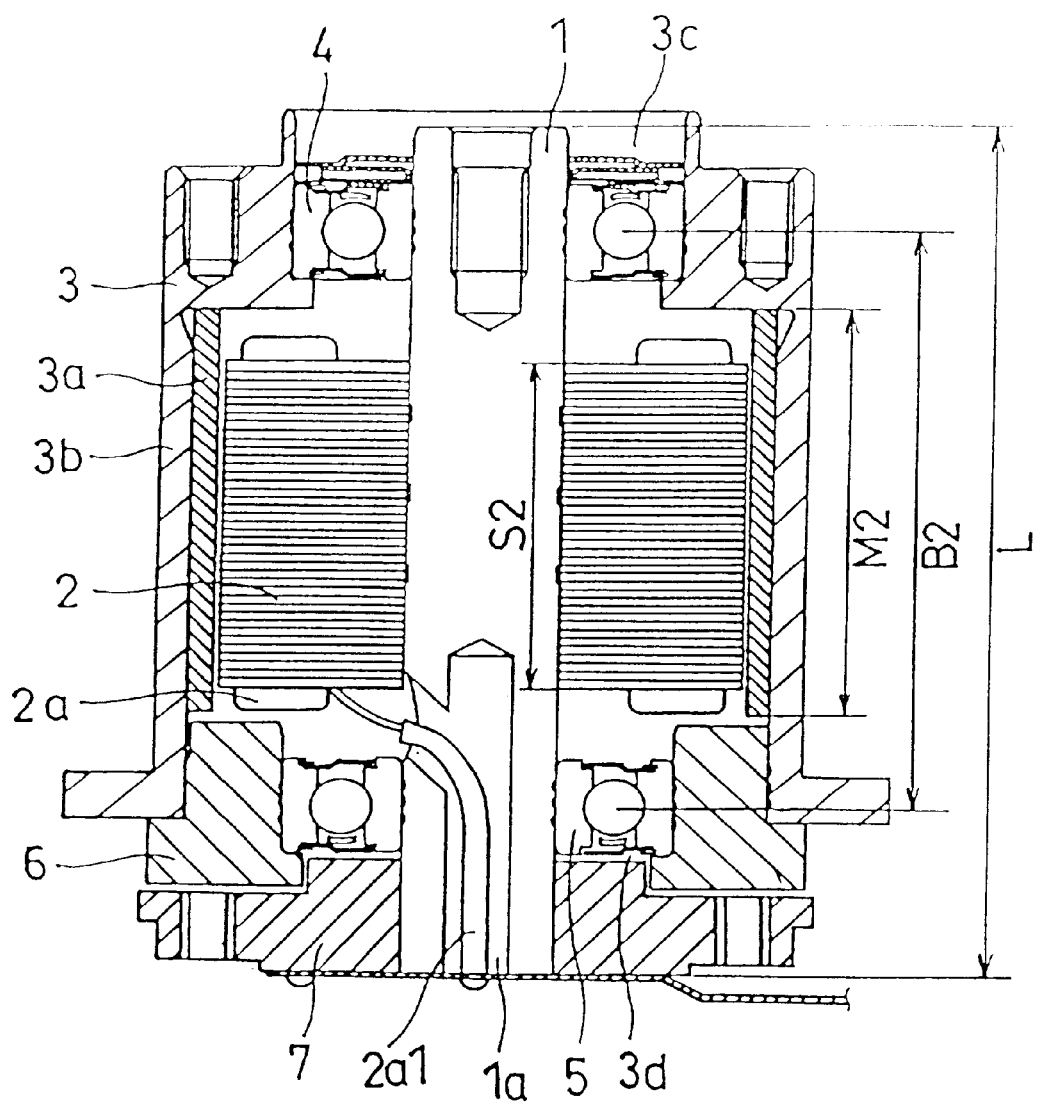
FIG. 4 is a longitudinal sectional view showing a conventional disc driving spindle motor.

In this case, a direct support structure in which the rotor 3 is supported by the shaft 1 only through the bearings 4 and 5 is taken. There is no intervention such as a bush 6 (see FIG. 4).

The stator 2 is disposed in the portion on the side of the lower opening surface 3d below the lower bearing 5 (between the lower bearing 5 and the opening surface 3d), i.e., in the enlarged diameter portion of the drum portion 3b in the example shown in FIG. 1. The stator 2 is supported by the shaft 1 through a frame 7 in the vicinity of the lower opening surface 3d.

An axial dimension Si of this stator 2 is set to be substantially the same as an axial dimension M1 of the magnets 3a. The stator 2 is fixedly supported to the shaft 1 through the frame 7 over a range of the full axial dimension S1 within the inside of the drum portion 3b of the rotor 3.

In the stator 2, the end surface position thereof on the side of the lower bearing 5 is set, on the side of the lower opening surface 3d, equal to or lower than the laminate surface position of the discs set at a predetermined position on the side of the lower opening surface 3d of the outer circumference of the drum portion 3b in the same manner. Its outer diameter is set to be smaller than the outer diameter of the drum portion 3b.

Incidentally, normally, a flanged portion 3b1 extending laterally is formed to be coaxial with the drum portion 3b and the shaft 1 at a predetermined position on the side of the lower opening surface 3d of the outer circumference of the drum portion 3b. Its upper surface 3b2 is used as a laminate surface for the above-described discs.

The frame 7 is a member for holding the shaft 1. The coil end 2a2 of the stator coils 2a is led to the outside of the rotor 3 (drum portion 3b) through a through hole 7a opened in the frame 7.

Any one of the above-described bearings 4 and 5 is a radial bearing as shown, but, a spacer 8 is provided between the outer races of both bearings 4 and 5 to fix both bearings 4 and 5 in place and to keep the distance therebetween. The spacer 8 is formed into a cylindrical shape and fitted into the inner wall of the drum portion 3b.

Incidentally, the reason why the spacer 8 is disposed between both bearings 4 and 5 is that the magnets 3a are not present between both bearings 4 and 5.

Here, in order to realize the arrangement that the stator 2 is disposed on the side of the lower opening surface 3d of the drum portion 3b below the position of the lower bearing 5, it is a main requisite that the respective axial dimensions M1 and S1 of the magnets 3a and the stator 2 are reduced.

In order to meet this condition, it is very effective to use the magnetic material that exceeds the magnetic energy product of 160 kJ/m3 rather than using the magnetic material of 160 kJ/m3 or less in the magnetic energy product that is used in the prior art.

The larger the magnetic energy product of the magnets 3a is, the smaller the axial dimension S of the stator 2 will become. According to this, it is possible to set the relationship of the axial dimension, M1<M2, of the magnets 3a and the relationship of the axial dimension, S1<S2, of the stator 2 (see FIG. 4 with respect to M2 and S2).

Then, if the axial dimension S1 of the stator 2 may be set to be small, it is possible to set the ratio L:B of the distance B between the bearings 4 and 5 to the shaft length L (nearly equal to the total motor length) to be increased.

In the motor shown in FIG. 1, when B1 is the distance between the bearings 4 and 5 and the magnetic characteristics and the other conditions of the stator 2 are kept unchanged, for example, the relationships, L:S1=1:0.13 and L:B1=1:0.52, are established. Namely, with respect to the ratio L:B, it is possible to realize the value of 0.5 or more that is generally needed. Accordingly, it is possible to readily realize such an arrangement that the stator 2 is disposed on the side of the lower opening surface 3d of the drum portion below the position of the lower bearing 5.

Incidentally, in the foregoing embodiment, the spacer 8 is formed as a separate member from the drum portion 3b. However, it is possible to form the spacer 8 integrally with the drum portion 3b.

Figure 2:
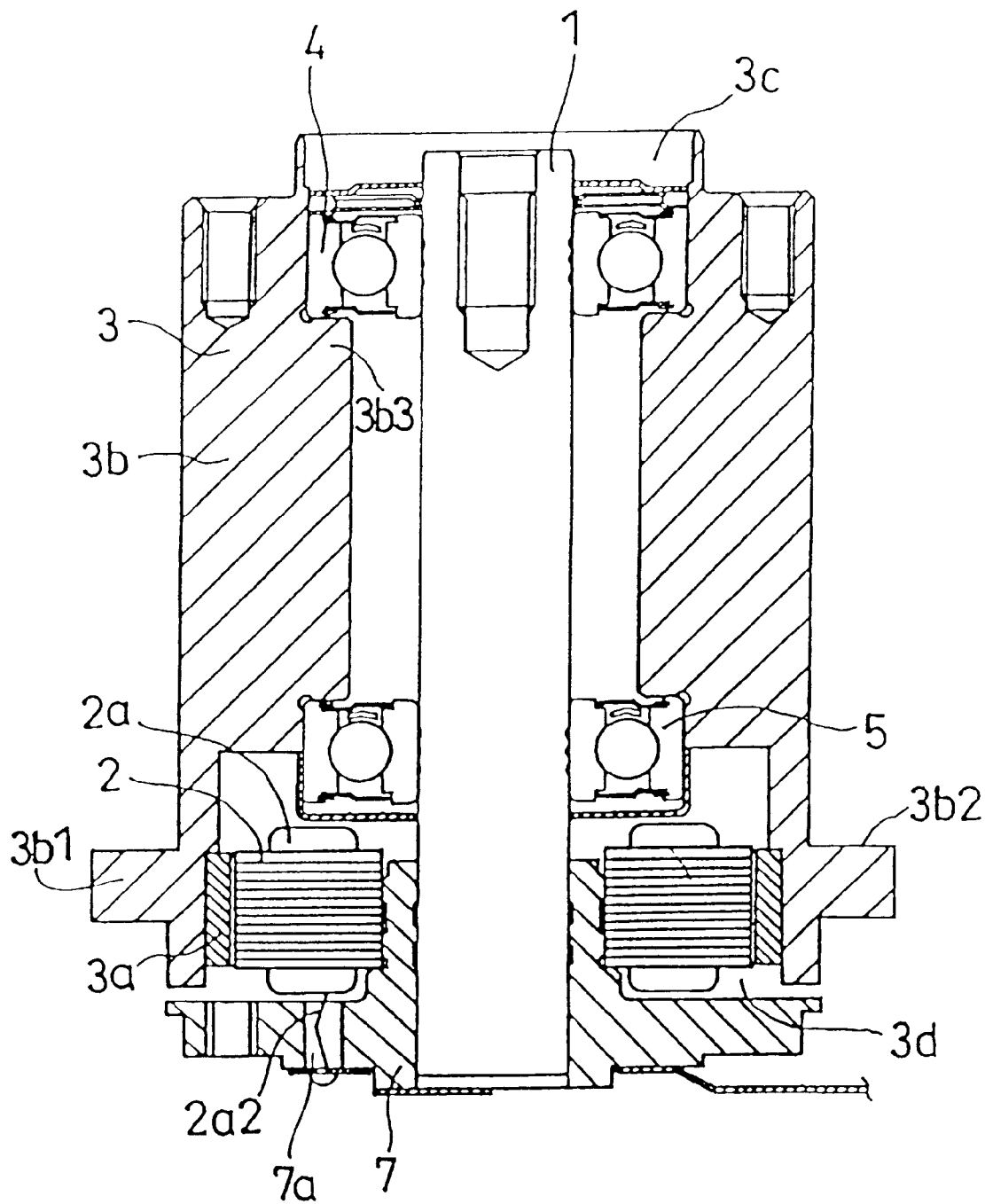
FIG. 2 is a longitudinal sectional view showing the disc driving spindle motor according to another embodiment of the invention.

FIG. 2 is a view showing an example in which a flanged portion 3b3 having the same shape as that of the spacer 8 is projectingly formed on the inner wall of the drum portion 3b and this serves as the above-described spacer 8. With this arrangement, it is possible to reduce the number of the mechanical parts and to simplify the structure.

If the bearings 4 and 5, the spacer 8 and the shaft 1 are formed integrally with each other, it is possible to further reduce the number of the mechanical parts and simplify the structure.

Figure 3:
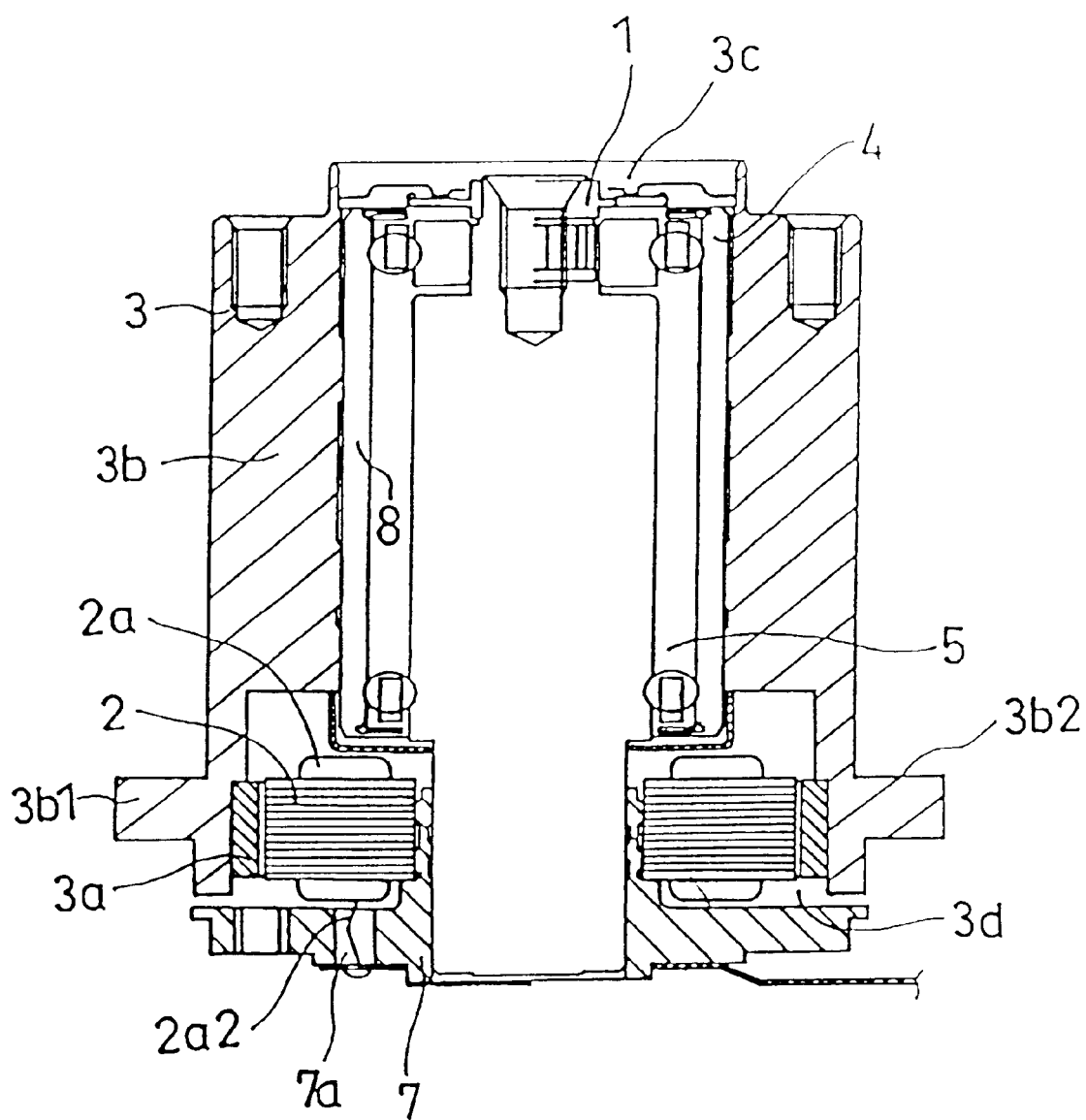
FIG. 3 is a longitudinal sectional view showing the embodiment different from that shown in FIG. 2.

FIG. 3 is a view showing an example in which the outer races of the bearings 4 and 5 are formed integrally with the spacer 8 and the inner race of the bearing 5 is formed integrally with the shaft 1.

Incidentally, in FIGS. 2 and 3, the same reference numerals are used to indicate the same components or the like components.

As described above, according to the present invention, the following effect is ensured since the stator may be arranged on the other opening surface side of the drum portion below the position of the second bearing (lower bearing).

The coil end of the stator coils may be led to the outside of the drum portion without interposing the bearings so that the processing of the shaft, the insertion of the lead wire through the tubular hole and the like may be dispensed with to reduce the part cost and the assembling work cost.

It is easy to assemble the stator in comparison with the prior art in which the stator is disposed between the two bearings. According to the present invention, since the stator is fixed to the frame for holding the shaft so as to be supported by the shaft through the frame, if the stator is fixed to the frame in advance, the coupling of the frame and the shaft may attain the support of the stator to the shaft. Accordingly, also with this arrangement, it is possible to facilitate the assembling work of the stator.

The rotor drum portion is supported by the shaft not through any bush. Accordingly, it is possible to ensure the effect that the assembling precision and the rotational precision are enhanced in comparison with the prior art that needs the bush, thereby reducing the assembling work cost. Due to the fact that the bush is not required, since the bush is an expensive and precise part, it is possible to ensure the effect that the part cost may be reduced.

It is possible to ensure the effect that the motor contour as a whole may be miniaturized without reducing the number of the mountable discs and without any displacement relative to the axis of the rotor.

What is claimed is:

1. An outer rotor disc driving spindle motor in which a rotor having a magnet facing a stator comprising a coil and fixedly supported on a shaft, is located outside of said stator, mounted to a shaft via a first and a second bearings provided with a spacer means inbetween, characterized in that;

said rotor is formed a cylindrically showing a drum portion in an axial dimension into which a plural number of discs are laminated in the axial direction and mounted on an outer circumference of said rotor, said rotor rotatably mounted on said shaft via said first bearing positioned in the vicinity of a first opening of said drum portion and said second bearing positioned in a predetermined portion on a side of a second opening, said stator is disposed on a side of said second opening beyond said second bearing and is fixed to a frame which supports said shaft in the vicinity of said second opening, an end surface of said second bearing is set at the same position as a position of the laminate surface position of said discs set in a predetermined position, on the side of the second opening surface, of the outer circumference of said drum portion or closer to the side of the second opening surface, with an outer diameter of said stator set smaller than an outer diameter of said drum portion, said magnet has a magnetic energy product such that a ratio of a distance between said first and second bearings to a length of said shaft set at 0.5 or more, and said spacer means is disposed between outer races of said first and second bearings.

2. The disc driving spindle motor according to claim 1, wherein said spacer means is a flanged portion formed as a projection from an inner wall of the drum portion of the rotor.

3. The disc driving spindle motor according to claim 1, wherein integrally formed outer races of said first bearing and said second bearing provide a spacer means, and inner race of said second bearing is formed integrally with said shaft.

\* \* \* \* \*